June 21, 1966  M. BRE ETAL  3,257,317
BEARING
Filed Aug. 28, 1962  2 Sheets-Sheet 1
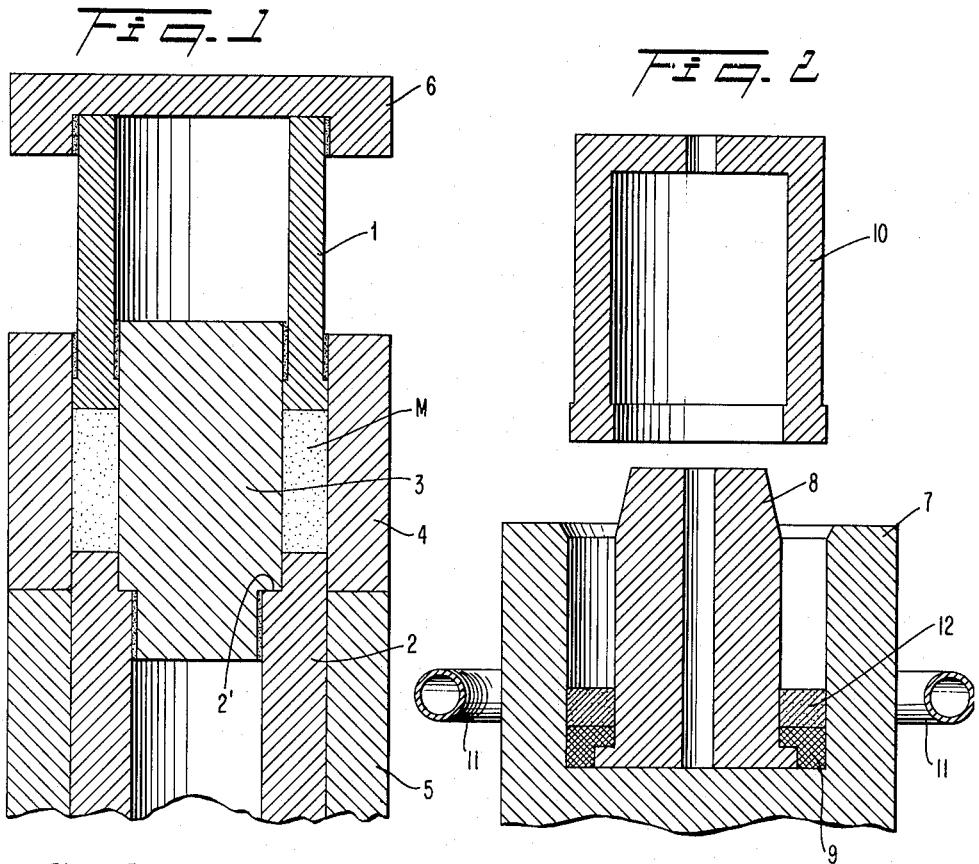
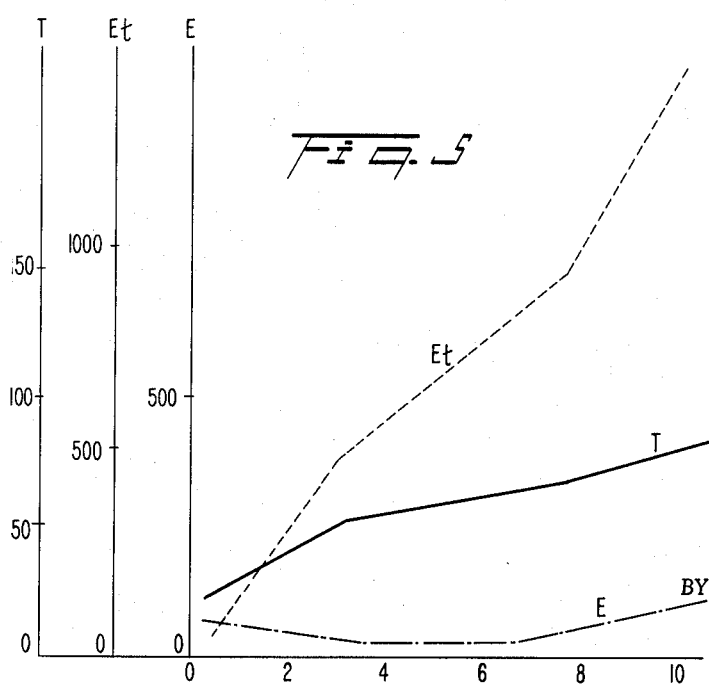
INVENTORS
MICHEL BRE
GEORGES FERAULT
BY Bauer and Seymour
ATTORNEYS

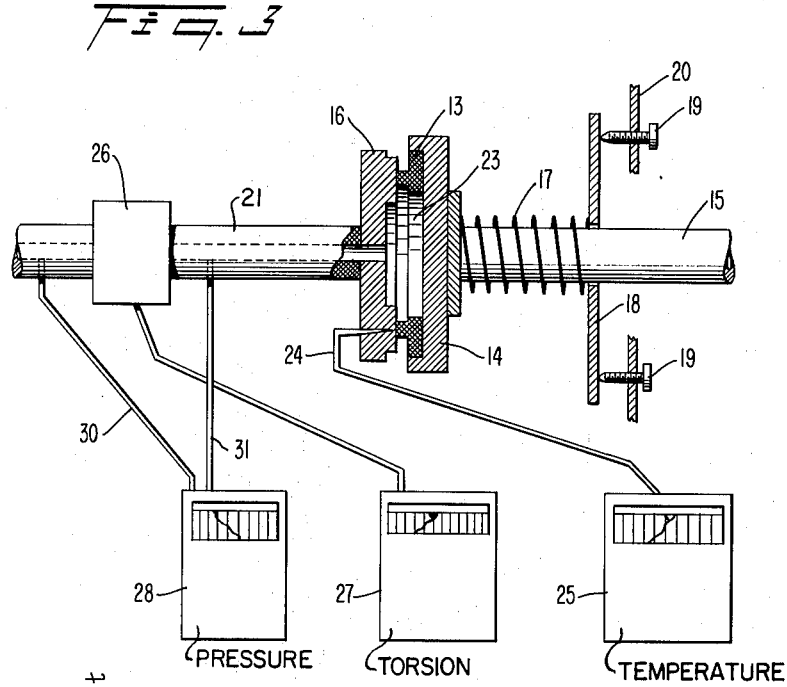
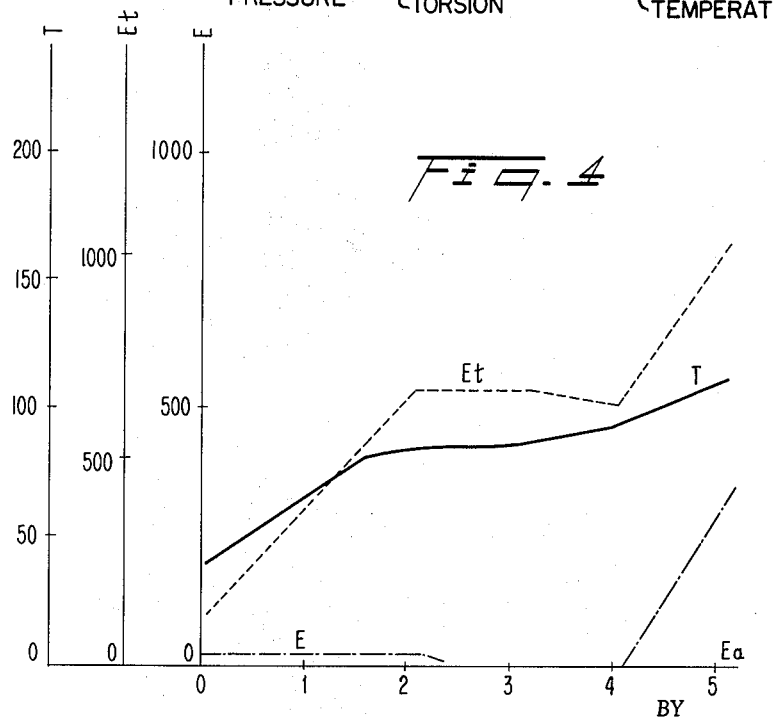
INVENTORS
MICHEL BRE
GEORGES FERAULT
BY
Bauer and Seymour
ATTORNEYS

United States Patent Office 3,257,317
Patented June 21, 1966

3,257,317
BEARING
Michel Bre and Georges Ferault, Paris, France, assignors to Compagnie de Saint-Gobain, Neuilly-sur-Seine, France
Filed Aug. 28, 1962, Ser. No. 219,839
Claims priority, application France, Mar. 26, 1962, 892,213
12 Claims. (Cl. 252—12)

This invention relates to self-lubricating bearings, the word "bearings" being used in a sense similar to the French "pieces de friction," and including such things as bearings, thrust bearings, dry joints, and tight joints, slides and sliders, and intermediate parts, for instance revetments which reduce the friction between parts, one of which slides in frictional contact with another, examples of which are ring liners, facings, sleeves for sliding and turning members such as spindles and drive shafts.

Many of such pieces have been made but perfection has not been attained by any of them. Among the difficulties which arose in the prior art are that some of them lack adequate response to shaping, others have unsatisfactory coefficients of expansion, some lack stability to heat, others have a poor coefficient of dry friction, and some disintegrate or wear away too rapidly.

It is an object of this invention to make self-lubricating bearings which have excellent properties of shaping and working, being easily molded to shape, and thereafter being subjected to turning, milling, drilling, tapping, threading, and sawing, thus facilitating their adaptation to a great variety of uses.

Another object is to impart to such bearings coefficients of expansion varying within large limits, for instance between 100 and $600 \times 10^{-7}$, which permits one to construct a particular bearing with a coefficient of expansion equal to that of metals with which it may be used.

Another object of the invention is to make such bearings with stability to heat up to 200° C. or more. Another object is to make such bearings with a low coefficient of friction. In general the coefficient of dry friction lies between .10 and .30; approximately speaking the coefficient of these new bearings is about .2, which is very good. Another object of the invention is to produce such bearings with good resistance to wear. Under test the bearings of this invention, when operated for 1,000 hours at a pressure of .5 kg./cm.$^2$ and at a speed of 15 m./s., gave generally a depth of wear comprised between .05 and .20 mm. that is to say approximately .1 mm., which is excellent performance.

Another object of the invention is to establish a successful process of molding such bearings, and yet another object is to determine the composition of the batches to be molded.

The objects of the invention are accomplished, generally speaking, by a self-lubricating bearing having the composition

| | Percent by true volume |
|---|---|
| Fluorinated alkylenic resin | 30–82 |
| Glass | 15–50 |
| Metal | 3–20 |
| Mica | 0–40 | of which the glass has the following viscosity-temperature relation

| 100,000 poises in the range | 300–800° C. |
|---|---|
| 10,000 poises in the range | 350–850° C. |
| 1,000 poises in the range | 400–900° C. |
| 100 poises in the range | 450–1050° C. |

Preferably the metal has a thermal diffusivity (c.g.s.) above about 0.3.

The objects as to batch are accomplished by a composition of matter for the manufacture of self-lubricating bearings including the following finely divided, uniformly intermixed ingredients in the percentages indicated:

| | Percent by true volume |
|---|---|
| Fluorinated alkylenic resin | 30–82 |
| Glass | 15–50 |
| Metal | 3–20 |
| Mica | 0–40 |

Preferably the particle sizes of glass, metal and mica are as follows:

| Glass | $\leqslant 100$ mu and preferably 50–80 mu. |
|---|---|
| Metal | $\leqslant 50$ mu and preferably 10–50 mu. |
| Mica | $\leqslant .1$ mm. |

Preferably the resin is in small fragments. For example said fragments are $\leqslant 0.8$ mm.

The objects as to process are accomplished by a method of making self-lubricating bearings which comprises intimately mixing finely divided fluorinated alkylenic resin, glass, metal, and mica in the following percentages by true volume 30–82%, 15–50%, 3–20%, and 0–40%, respectively, molding the mixture at moderate to heavy pressure below the temperatures at which the resin frits, fritting the shape thus prepared and cooling the shape.

The novel bearings may be obtained by intimately mixing finely divided particles of fluorinated alkylenic resin with finely divided particles of glass and with metal in the following proportions:

| | Percent by true volume |
|---|---|
| Fluorinated alkylenic resin | 30–82 |
| Glass | 15–50 |
| Metal | 3–20 |

In the preferred form of the invention, which will now be described, the fluorinated resin is selected from the fluorinated ethylenic resins of which polytetrafluoroethylene, monochlorotrifluoroethylene, and polyvinylfluoride are examples. These resins may be used singly or in various mixtures. Polytetrafluoroethylene has been chosen for presentation in the examples as it gives excellent results and permits comparisons to be made between other factors. This resin is finely divided. For example it passes through a screen having .8 mm. apertures; this size is illustrative and not critical.

The glass is preferably divided into particles $\leqslant 100$ mu and preferably 50–80 mu. It has the following characteristics:

The temperature which corresponds to a viscosity of 100,000 poises lies between 300° C. and 800° C.;
The temperature which corresponds to a viscosity of 10,000 poises lies between 350° C. and 850° C.;
The temperature which corresponds to a viscosity of 1,000 poises lies between 400° C. and 900° C.;
The temperature which corresponds to a viscosity of 100 poises lies between 450° and 1050° C.

Glasses which satisfy these conditions of viscosity are generally found among the following types, the lead borates, the lead borosilicates, the alkali-borosilicates, the borosilicates of various metals, and the alumino-phosphoric complex glasses.

Specific compositions of glass will be found in the examples.

Within the range of characteristics stated above are two groups which are especially useful. In the first of these the temperature which corresponds to 100,000 poises is between 300 and 550° C.; the temperature corresponding to 10,000 poises is between 350 and 600° C.; the temperature corresponding to a viscosity of 1,000 poises is between 400 and 650° C.; and the temperature corresponding to a viscosity of 100 poises is between 450 and 700° C.

In the second of these groups the temperature which corresponds to a viscosity of 100,000 poises is between 650 and 800° C.; that corresponding to 10,000 poises is between 700 and 850° C.; that corresponding to 1,000 poises is between 750 and 900° C.; and that corresponding to 100 poises is between 800 and 1050° C.

The metal, including alloys, used is preferably chosen among those which have both a degree of hardness and a good thermal diffusivity. Thermal diffusivity is the ratio of thermal conductivity to the product of specific heat and specific mass. In general it is advantageous to work with a metal having a (Brinell) hardness below 160 kg./mm.$^2$ and a thermal diffusivity (c.g.s.) above 0.3. Exemplary metals corresponding to these requirements are copper, gold, silver, bronze, and brass. The metal is sufficiently fine and sufficiently dry to be readily dispersed in the mass of resin and glass powder. For this purpose a grain size $\leqslant 50$ mu and preferably 10–50 mu is usually satisfactory.

The compositions may also advantageously contain finely divided mica which may be present from 0 to 40% by volume, the percentages of resin, glass and metal remaining as above stated. Preferably the mica will be present between 5 and 40% by volume and if desired between 5 and 30% by volume. The mica is to be uniformly distributed throughout the batch. If the content of mica falls below 5% there is difficulty in obtaining uniform distribution. If it exceeds 30% it is possible for mica stratifications to occur. The mica may be natural or synthetic and the desired particles are preferably $\leqslant .1$ mm. in size. The presence of mica results in a lower and stabler coefficient of friction. For example when mica is used as indicated, the coefficients of friction are regularly below .15, but bearings retain the ease of working, the variability of the coefficient of expansion, and the stability of temperatures to or above 200° C., which are characteristics of the mica-free compositions, and the wear under dry friction is not superior.

In one specific modification of the invention the mica was partially substituted for glass in the composition and it was found that this replacement of glass particles by mica particles could be carried out without failure until only about 5% by volume of the composition was composed of glass.

The intimate mixing of the powdered raw materials can be carried out in any satisfactory prior art mixing apparatus. A particular apparatus is set forth in the examples but is not essential to the preparation of a uniformly intermingled batch. During the mixing the temperature is kept down to prevent the introduction of changes in the resin and the mixing is carried out until any packs of glass or resin which form during the operation have been dispersed.

The batch thus obtained is substantially homogeneous and can be subjected to shaping and heat-treatment in various ways. The nature of the shaping operation and the heat-treatment will depend largely on the kind of resin which is being used. The preferred form of the invention uses a double molding operation at different temperatures but the process can be carried out with only one or even without any mold and the product will be satisfactory for some uses. Using polytetrafluoroethylene as the resin in the composition the following methods, stated in their order of preference, produce satisfactory products.

In the preferred process using polytetrafluoroethylene as an example, a charge of the batch is put in a mold in the cold and is subjected to pressure, the value and the time of application of which allow the escape of the air from between the particles. Pressures from 100 to 1000 kg./cm.$^2$ are applied from one minute to several tens of minutes. This forms a preform which is removed and put into a second mold which has the final shape desired in the bearing. This mold is heated to a temperature at which the resin frits for instance by progressively heating the second mold to a temperature of 370 to 400° C. This temperature is maintained for a number of hours, for instance over night, a pressure of 100 to 200 kg./cm.$^2$ is then applied and the mold is cooled while maintaining the pressure. The object is then in its definitive shape and can be worked as indicated hereinabove to fit it to its intended use.

In a second method the homogeneous batch is put into a mold in the cold and subjected to pressure in the upper order of the range indicated above for about 15 minutes or more. The preform thus formed is removed and heated in an oven progressively to a temperature at which the resin frits. At the end of the fritting the fritted piece is put in a mold, a pressure from 100 to 200 kg./cm.$^2$ is applied and the mold is cooled while this pressure is maintained. The advantage of this process is that a mold is not used during the fritting.

In a third method the molding and fritting is carried out as in the preceding paragraph and at the end of the fritting the piece is cooled. This has in particular the advantage of using only one mold but it produces pieces which have a more limited field of use as their mechanical strength and resistance to wear are not the equal of the pieces produced by the two-mold process.

In making the mold used to make the preform it is advisable to employ steels which are hard and mechanically resistant. The mold used for the definitive shaping of the piece must be capable of being heated to the necessary temperature. It should have interior surfaces which require no machining of the finished product and should be used only for those pressures for which it is adapted.

The following examples illustrate the process.

In considering these examples it should be kept in mind that the other resins of the class indicated are equally useful. The examples are based upon the shaping of dry joints in the form of rings 100 mm. in exterior diameter, 65 mm. in interior diameter and 15 mm. thick. Such rings serve in operation to establish butt joints, between pieces which move relatively one to the other, which are tight to fluids.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings wherein like reference characters refer to like parts throughout the several views;

FIG. 1 is a vertical section through a preform mold;

FIG. 2 is a vertical section through a final mold;

FIG. 3 is an elevation in partial section through test apparatus;

FIGS. 4 and 5 are graphs.

*Example 1*

The batch contained 40.6% by true volume of polytetrafluoroethylene finely divided, 49.1% of glass powder passing through a 80 mu screen but not through a 50 mu screen, and 10.3% of copper powder passing through a 40 mu screen. The glass had the empirical constitution of 5% $SiO_2$, by weight, 20% $B_2O_3$ and 75% PbO; it had a viscosity of 100,000 poises at 530° C., 10,000 at 550° C., 1,000 at 575° C., and 100 poises at 610° C.

The mixture was blended in a mixer utilizing a two-blade knife rotating at 17,000 r.p.m. inside a chamber of 750 cm.$^3$. Between 125 and 150 grams of batch were used. The mixer acted 40 seconds and the mixture was allowed to cool to prevent overheating. This was repeated four times on the same charge.

150 grams of the mixture was put into the mold shown in FIG. 1. This mold has an outer steel ring 5 and an inner steel ring 2 provided with an internal annular shoulder 2′, an upper outer ring 4, a core 3 which has a conforming shoulder, a pressure ring 1 and a cap 6. The mixture M was poured evenly on top of the ring 2, ring 4 and core 3 being in place, the pressure ring was put in place and a press applied to the mass, generating 700 kg./cm.² for 10 minutes. The pressure was released and the mold was dismantled to obtain the preform, which was transferred to the mold of FIG. 2, which was heated by a gas-fired ring 11 and included the pot 7, the core 8 and the pressure ring 10. A blank 9 was placed between ring 12 and the base of the pot to center the core and supply the lower surface of the mold. The preform mold was 13% chrome-steel, tempered and annealed. The final mold was 10% tungsten steel. The temperature of the final mold was raised to 380° C. over an hour and a half, the preform being on the ring 9 and the upper pressure ring 10 being placed on top of the preform. The temperature was maintained over night. The mold was then placed in a press and subjected to 140 kg./cm.² and allowed to cool, pressure being maintained. The mold was dismantled and the ring was removed. It was hard and homogeneous and retained the impression of the surfaces of the mold. It was subjected to tests and found to be of superior properties.

When turned with steel tools at high speed on a lathe a continuous and flexible turning was obtained. A variety of shapes were turned out of the new materials, one of which had the shape shown in FIG. 3 at 13.

The bearing 13 was mounted on a steel plate 14 which was fixed on the end of a rotary shaft 15, controlled by mechanism not shown. It bore against the face of a plate 16 under the thrust of a spring 17. The compression of the spring could be changed by adjusting the position of plate 18 by screws 19. The plate 16 was fixed at the end of a hollow shaft 21, the conduit of which terminated at one side in the space 23 and was sealed by the gasket-bearing 13. At its other end the conduit was open to a source of gas under pressure, not shown. A thermocouple 24 was seated in a cavity in plate 16 near the friction surface and was connected to a temperature register 25. The couple of rotation resulting from the friction of the gasket on the plate was measured by a captor 26 disposed on the shaft 21 connected to the register 27. A pneumatic register 28 was connected to the conduit at two points so as to measure the fall of gas pressure between those points; from this loss of head can be determined the escape of gas at the contact surface between gasket and plate 16. The initial axial effort was set at 1 kg. and the shaft was rotated for 24 hours, the registers being continuously operated, after which the mean value was determined, then the axial effort was increased to 2 kg. and the test was repeated. FIG. 4 shows the results. On that diagram, axial effort $E_a$ is shown on the abscissa, expressed in kg. On the ordinate are these values, T for temperature in degrees C., $E_t$ for the tangential effort in grams, and E for the escape of gas in cm.³/h. These three graphs show, respectively, the variation of temperature, the variation of tangential effort and of sealing as a function of the effort applied axially. The total of these curves shows that the material which constitutes the joint is excellent for axial effort up to 4 kg. The graph shows that up to this value the joint is tight, the temperature at the friction face is less than 100° C., and the coefficient of friction (the ratio of tangential effort to axial effort) decreases until it reaches .15.

*Example 2*

The mixture used as the batch contained 67.3% by true volume polytetrafluoroethylene finely divided, 28% glass powder, which passed through a 100 mu screen but not through a 50 mu screen, and 4.7% of copper, which passed through a 50 mu screen. The glass had the following composition by weight:

| | Percent |
|---|---|
| $P_2O_5$ | 30 |
| $B_2O_3$ | 20 |
| $Al_2O_3$ | 15 |
| $Na_2O$ | 6 |
| CaO | 12 |
| MgO | 17 |

The glass also had the viscosity of:

100,000 poises at 750° C.
10,000 poises at 790° C.
1,000 poises at 840° C.
100 poises at 940° C.

The mixing of powders was carried out as stated in Example 1.

200 grams of this mixture were put in the mold of FIG. 1 and compressed as in Example 1. The preform was then treated as in Example 1 and was subjected to the identical tests, giving substantially the same results, except that the coefficient of friction is higher; however it did not exceed generally .25.

*Comparative example*

In order to demonstrate the different results which are obtained with a mixture containing glass which lacks the viscosity characteristics of the glass of this invention a mixture of 60% by true volume polytetrafluoroethylene finely divided, 25% glass, passing a 50 mu screen, and 15% bronze, passing a 30 mu screen, was mixed in the same way. The glass had the composition by weight:

| | Percent |
|---|---|
| $SiO_2$ | 70 |
| MgO | 4 |
| CaO | 12 |
| $Na_2O$ | 14 |

It had the temperature-viscosity relationship:

100,000 poises at 900° C.
10,000 poises at 1000° C.
1,000 poises at 1150° C.
100 poises at 1360° C.

200 grams of this mixture was treated exactly as in Example 1 and the gasket-bearing was subjected to the same test. The coefficient of friction attained .8 and the product was unstable. A high rise in temperature occurred in the neighborhood of the rubbing surface and a rapid deterioration of the face of the object occurred by disintegration of the resin.

*Example 3*

A mixture included polytetrafluoroethylene finely divided, 45% by true volume, glass powder less than 70 mu, 35%, and copper less than 50 mu, 20%. The glass had the composition by weight:

| | Percent |
|---|---|
| $P_2O_5$ | 56 |
| $Al_2O_3$ | 10 |
| $Na_2O$ | 8 |
| $K_2O$ | 17 |
| MgO | 4 |
| ZnO | 5 |

The glass had the viscosity characteristics:

100,000 poises at 475° C.
10,000 poises at 500° C.
1,000 poises at 530° C.
100 poises at 590° C.

The mixture was made as in Example 1. 125 grams of the mixture was molded as in Example 1, producing a preform which was put into an oven at 380° C. for 16 hours. After which it was put into the second mold described in Example 1 and subjected to a pressure of 140 kg./cm.² while it was cooling, which required 15 minutes. The shape was removed from the mold. The process differed from that of Example 1 in that the preform was not supported during fritting. There was the inconvenience that an oxidized layer of 1 to 2 mm. thickness appeared on the surface of the piece, but this was easily removed by machining. The machined piece was tested as in Example 1 and gave comparable results, the measurements being substantially as that in that example although the coefficient of friction was higher, but even so it did not generally exceed .25.

*Example 4*

50% by true volume of the same resin finely divided was mixed in the same way with 35% of less than 60 mu glass and 15% of less than 40 mu brass containing ⅔ copper and ⅓ zinc. The glass had the empirical constitution by weight:

| | Percent |
|---|---|
| $SiO_2$ | 16 |
| $B_2O_3$ | 10 |
| PbO | 74 |

The glass had the viscosity characteristics of:
100,000 poises at 520° C.
10,000 poises at 550° C.
1,000 poises at 615° C.
100 poises at 700° C.

The preform was made as in Example 3 and put in an oven at 380° C. for 16 hours, then cooled in the air. This process is simpler than that of Examples 1 to 3 because it did not require the use of 2 molds and because the preform is not submitted to a compression. The layer of oxidation appeared to a depth of 1 to 2 mm. The piece was slightly deformed and had a slightly irregular surface. The oxidized layer and the deformations were removed by machining, producing a piece which looked like that of Example 3 but which, under the same tests, provided a less perfect seal, the gas escaping however at not more than 200 cm.³/h. The coefficients of friction were not substantially different from those of the object of Example 3.

*Example 5*

The mixture, percentages being in true volume, contained 31% finely divided polytetrafluoroethylene, 38% of glass which passed through a 80 mu screen but not through a 50 mu screen, 7% copper passing through a 40 mu screen and 24% phlogopite mica which passed a 70 mu screen.

The glass had the composition:

| | Percent by weight |
|---|---|
| $SiO_2$ | 5 |
| $B_2O_3$ | 20 |
| PbO | 75 |

The glass had the following temperature-viscosity characteristics:
100,000 poises at 530° C.
10,000 poises at 550° C.
1,000 poises at 570° C.
100 poises at 610° C.

The mixing was carried out as in Example 1 and the operations of molding and testing were as in that example. The gasket bearing was of fine structure, reddish color and mirror aspect. It had the following characteristics under test:

Machined on the lathe with high speed tools it did not cast off grains but produced a continuous and flexible strip. It was tested on the same apparatus as in Example 1 and gave the results which are set forth in FIG. 5. In that figure the abscissa includes the axial effort $E_a$ in kg. and the ordinate the temperature T in degrees C., the tangential effort $E_t$ in grams and the seal defect E in cm.³/h. The total of the three curves thus obtained shows that the piece is excellent for axial effort up to 6 kg., during which the sealing is practically perfect, the temperature is less than 65° C., and the coefficient of friction is less than .13.

*Example 6*

The mixture in true volume contained 56% of the same finely divided resin, 23% of glass powder, which passed through a 70 mu screen, 4% of copper powder, which passed through a 50 mu screen and 17% of muscovite mica, which passed through a 50 mu screen. The glass had the content by weight:

| | Percent |
|---|---|
| $P_2O_5$ | 56 |
| $Al_2O_3$ | 10 |
| $Na_2O$ | 8 |
| $K_2O$ | 17 |
| MgO | 4 |
| ZnO | 5 |

The glass had the following temperature-viscosity relationship:
100,000 poises at 475° C.
10,000 poises at 500° C.
1,000 poises at 430° C.
100 poises at 590° C.

The mixture was treated as in Example 3. There was an oxidized layer of 1 to 2 mm. thickness of rough surface and black color which was removed by machining, producing a mirror surface of reddish aspect. The test of this piece, as in Example 1, showed that it had excellent characteristics up to 5 kg., during which the temperature did not exceed 75° C., the sealing was perfect, and the coefficient of friction was less than .15.

*Example 7*

The batch contained by volume 38% of the same finely divided resin, 33% of glass powder, passing a 70 mu screen, 12% of bronze, passing a 30 mu screen, and 17% of mica passing a 50 mu screen. The glass had the composition by weight:

| | Percent |
|---|---|
| $P_2O_5$ | 30 |
| $B_2O_3$ | 20 |
| $Al_2O_3$ | 15 |
| $Na_2O$ | 6 |
| CaO | 12 |
| MgO | 17 |

The glass had the following temperature-viscosity relationship:
100,000 poises at 750° C.
10,000 poises at 790° C.
1,000 poises at 840° C.
100 poises at 940° C.

The mixture was treated as in Example 3. The piece was similar to that of Example 6, and after machining was yellow in color. The test was carried out as in Example 1 and showed that the piece was excellent for axial effort up to 5 kg., giving approximately perfect seal; a temperature less than 70° C., and a coefficient of friction less than .15.

The advantages of the invention are the accomplishment of the objects of the invention as stated hereinabove.

It is to be understood that other resins of the class described are also useful.

As many apparently widely different embodiments of the present invention may be made without departing from the spirit and scope thereof, it is to be understood that the invention is not limited to the specific embodiments.

What is claimed is:

1. A self-lubricating bearing having the composition:

| | Percent by true volume |
|---|---|
| finely divided fluorinated alkylenic resin | 30–82 |
| glass | 15–50 |
| at least one member of the group consisting of metals and alloys | 3–20 | said glass having the following viscosity at a temperature within the respective ranges indicated:
- 100,000 poises at 300 to 800° C.
- 10,000 poises at 350 to 850° C.
- 1,000 poises at 400 to 900° C.
- 100 poises at 450 to 1050° C.

said glass having a particle size ≤100 microns, said metals and alloys having a Brinell hardness below 160 kg./mm.², a thermal diffusivity above 0.3 unit c.g.s., and a particle size ≤50 microns.

2. A self-lubricating bearing according to claim 1 in which said glass has the following viscosity at a temperature within the respective temperature ranges indicated:
- 100,000 poises at 300 to 550° C.
- 10,000 poises at 350 to 600° C.
- 1,000 poises at 400 to 650° C.
- 100 poises at 450 to 700° C.

3. A self-lubricating bearing according to claim 1 in which said glass has the following viscosity at a temperature within the respective temperature ranges indicated:
- 100,000 poises at 650 to 800° C.
- 10,000 poises at 700 to 850° C.
- 1,000 poises at 750 to 900° C.
- 100 poises at 800 to 1050° C.

4. A self-lubricating bearing having the composition:

| | Percent by true volume |
|---|---|
| finely divided fluorinated alkylenic resin | 30–82 |
| glass | 10–50 |
| at least one member of the group consisting of metals and alloys | 3–20 |
| mica | 5–30 | said glass having the following viscosity at a temperature within the respective ranges given:
- 100,000 poises in the range 300–800° C.
- 10,000 poises in the range 350–850° C.
- 1,000 poises in the range 400–900° C.
- 100 poises in the range 450–1050° C.

said glass having a particle size ≤100 microns, said metals and alloys having a Brinell hardness below 160 kg./mm.², a thermal diffusivity above 0.3 unit c.g.s., and a particle size ≤50 microns, said mica having a particle size ≤100 microns.

5. A self-lubricating bearing having the composition:

| | Percent by true volume |
|---|---|
| finely divided fluorinated alkylenic resin | 30–82 |
| glass | 10–50 |
| at least one member of the group consisting of metals and alloys | 3–20 |
| mica | 5–40 | said glass having the following viscosity at a temperature within the respective ranges given:
- 100,000 poises in the range 300–800° C.
- 10,000 poises in the range 350–850° C.
- 1,000 poises in the range 400–900° C.
- 100 poises in the range 450–1050° C.

said resin being selected from the group consisting of polytetrafluoroethylene, monochlorotrifluoroethylene, and polyvinylfluoride, said glass having a particle size ≤100 microns, said metals and alloys being selected from the group consisting of copper, gold, silver, bronze and brass, and having a particle size ≤50 microns, said mica having a particle size ≤100 microns.

6. A self-lubricating bearing according to claim 5 in which the glass has the following viscosity at a temperature within the respective ranges given:
- 100,000 poises at 300–550° C.
- 10,000 poises at 350–600° C.
- 1,000 poises at 400–650° C.
- 100 poises at 450–700° C.

7. A self-lubricating bearing according to claim 5 in which the glass has the following viscosity at a temperature within the respective ranges given:
- 100,000 poises at 650–800° C.
- 10,000 poises at 700–850° C.
- 1,000 poises at 750–900° C.
- 100 poises at 800–1050° C.

8. A self-lubricating bearing having the composition:

| | Percent by true volume |
|---|---|
| fluorinated alkylenic resin | 30–82 |
| glass | 5–50 |
| at least one member of the group consisting of metals and alloys | 3–20 |
| mica | 0–40 | the sum of said mica and glass being at least equal to 15% by true volume, said glass having the following viscosity at a temperature within the respective ranges following:
- 100,000 poises in the range 300–800° C.
- 10,000 poises in the range of 350–850° C.
- 1,000 poises in the range 400–900° C.
- 100 poises in the range 450–1050° C.

said metals and alloys having a Brinell hardness below 160 kg./mm.² and a thermal diffusivity above 0.3 units c.g.s.

9. A self-lubricating bearing according to claim 8 in which the glass has the following viscosity at a temperature within the respective ranges given:
- 100,000 poises at 300 to 550° C.
- 10,000 poises at 350 to 600° C.
- 1,000 poises at 400 to 650° C.
- 100 poises at 450 to 700° C.

10. A self-lubricating bearing according to claim 8 in which the glass has the following viscosity at a temperature within the respective ranges given:
- 100,000 poises at 650 to 800° C.
- 10,000 poises at 700 to 850° C.
- 1,000 poises at 750 to 900° C.
- 100 poises at 800 to 1050° C.

11. A self-lubricating bearing having the following composition, all by true volume, and all finely divided: resin selected from the group consisting of polytetrafluoroethylene, monochlorotrifluoroethylene, and polyvinylfluoride, 30 to 82%; glass, 15 to 50%; at least one member of the group of metals and allows consisting of copper and alloys thereof with tin and zinc, gold and silver, 3 to 20%, said glass having the following viscosity at a temperature within the respective ranges following: 100,000 poises in the range 300 to 800° C.; 10,000 poises in the range 350 to 850° C.; 1,000 poises in the range 400 to 900° C., and 100 poises in the range 450 to 1050° C., said glass having a particle size ≤100 microns, said metals and alloys having a particle size ≤50 microns.

12. A self-lubricating bearing consisting by true volume of a uniform mixture of resin selected from the group consisting of polytetrafluoroethylene, monochlorotrifluoroethylene, and polyvinylfluoride, 30 to 82%; glass, 5 to 50%; at least one member of the group of metals and alloys consisting of copper and alloys thereof with tin and zinc, gold and silver, 3 to 20%; and mica up to 40%, the sum of said glass and mica being at least 15% by true volume, all said materials being finely divided, said glass having a particle size ≤100 microns, said metals and alloys having a particle size ≤50 microns, and said mica having a particle size ≤0.1 mm.

(References on following page)

References Cited by the Examiner

UNITED STATES PATENTS

| | | | |
|---|---|---|---|
| 2,400,099 | 4/1946 | Brubaker et al. | 252—12 |
| 2,691,814 | 10/1954 | Tait et al. | 252—12 |
| 2,824,060 | 2/1958 | White | 252—12 X |
| 3,067,135 | 12/1962 | Strub | 252—12 |
| 3,122,505 | 2/1964 | Rulon-Miller et al. | 252—12 |

DANIEL E. WYMAN, *Primary Examiner.*

R. E. HUTZ, E. W. GOLDSTEIN, P. P. GARVIN,
*Assistant Examiners.*